United States Patent [19]

Hashimoto et al.

[11] Patent Number: 5,458,979
[45] Date of Patent: Oct. 17, 1995

[54] MAGNETIC RECORDING MEDIUM HAVING A MAGNETIC LAYER COMPRISING FERROMAGNETIC PARTICLES, POLYURETHANE RESIN AND POLYVINYLACETAL RESIN

[75] Inventors: Hiroshi Hashimoto; Masaki Satake; Yuuichirou Murayama; Tsutomu Okita, all of Kanagawa, Japan

[73] Assignee: Fuji Photo Film Co., Ltd., Kanagawa, Japan

[21] Appl. No.: 243,917

[22] Filed: May 17, 1994

[30] Foreign Application Priority Data

May 17, 1993 [JP] Japan ............................ 5-136968

[51] Int. Cl.$^6$ ............................................. G11B 5/00
[52] U.S. Cl. ............... 428/425.9; 428/522; 428/694 B; 428/694 BU; 428/694 BM; 428/900
[58] Field of Search ........................ 428/323, 425.9, 428/694 B, 694 BU, 694 BM, 900, 522

[56] References Cited

U.S. PATENT DOCUMENTS 3,650,828  3/1972  Higashi et al. .................... 117/235
4,092,256  5/1978  Goodson et al. ................... 252/62.54
5,091,249  2/1992  Nishikawa et al. ................. 428/336

FOREIGN PATENT DOCUMENTS 1236290  9/1989  Japan.
2220221  9/1990  Japan.

*Primary Examiner*—Stevan A. Resan
*Attorney, Agent, or Firm*—Sughrue, Mion, Zinn, Macpeak & Seas

[57] ABSTRACT

A magnetic recording medium comprising a nonmagnetic support having on at least one side thereof a magnetic layer comprising a ferromagnetic particle and a binder, wherein the binder comprises a polyvinyl acetal resin having a polar group and a polyurethane resin having a polar group; and a magnetic recording medium comprising (a) a nonmagnetic support having on at least one side thereof at least one of a lower magnetic layer comprising a ferromagnetic particle and a binder and a nonmagnetic layer comprising a nonmagnetic particle and a binder and (b) an upper magnetic layer comprising a ferromagnetic particle and a binder provided thereon, wherein at least the binder contained in the upper magnetic layer comprises a polyvinyl acetal resin having a polar group and a polyurethane resin having a polar group.

4 Claims, No Drawings

MAGNETIC RECORDING MEDIUM HAVING A MAGNETIC LAYER COMPRISING FERROMAGNETIC PARTICLES, POLYURETHANE RESIN AND POLYVINYLACETAL RESIN

FIELD OF THE INVENTION

This invention relates to a magnetic recording medium comprising a nonmagnetic support having thereon a magnetic layer comprising a ferromagnetic particle dispersed in a binder.

BACKGROUND OF THE INVENTION

Magnetic recording media are widely used as, for example, recording tapes, video tapes, computer tapes, disks. Recently higher-density recording has been required for the magnetic recording media, and, as a result, recording wavelengths have been shortened. Recording system has been examined over a digital system as well as an analog system. Magnetic recording media using a metal thin layer as the magnetic layer have been proposed to satisfy the requirements of high-density recording.

Various methods have been conventionally proposed to improve the electromagnetic characteristics of the coated type magnetic recording media. For example, the improvements of magnetic characteristics of ferromagnetic powder or smooth of surface have been proposed. However, these proposals have been still not sufficient for the requirements of higher-density recording.

Further, recording wavelengths are likely to be shortened with higher-density recording in recent years. When the thickness of the magnetic layer of the magnetic recording media is thick, there are caused problems with regard to lowering in output, self-demagnetization loss during recording and thickness loss during reproduction.

Accordingly, it is desirable to thin the thickness of the magnetic layer. However, when the thickness of the magnetic layer is thinned, the surface of the magnetic layer is likely to be affected by the surface roughness of the nonmagnetic support, and electromagnetic characteristics are likely to be deteriorated. Further, when excellent electromagnetic characteristics are to be ensured, there is caused a problem that good running durability cannot be obtained.

Various experiments have been made to improve the dispersibility of ferromagnetic particle by improving the binder as well as to improve the mechanical strength of the magnetic layer, thereby solving the above-described problems.

For example,
a) JP-A-1-236290 (the term "JP-A" as used herein means an "unexamined published Japanese patent application") discloses that a squareness ratio and abrasion resistance can be improved by using polyvinyl acetal resins having a degree of acetoacetalization of 85% by weight or more;
b) JP-A-2-220221 discloses that polyvinyl acetal resins comprising a unit composition having a hydrophilic group are used to improve the squareness ratio and the S/N ratio;
c) JP-A-60-34166 discloses polyvinyl acetal resins having a —COOM group; and
d) JP-B-58-41565 (the term "JP-B" as used herein means an "examined Japanese patent publication") discloses polyurethane resins having an —SO₃M group.

However, it has been found that when a hydrophilic group is introduced into the polyvinyl acetal resins, the dispersibility can be improved, but the degree of the improvement it still insufficient, and the smoothness of the magnetic layer and the electromagnetic characteristics are also insufficient.

Further, the polyvinyl acetal resins have a higher Tg (glass transition temperature) and provide a higher film strength than vinyl chloride binders, but there are problems that the running durability thereof is insufficient, and clogging is caused.

The polyvinyl acetal resins have been used in combination with polyurethane resins to solve the problem with regard to clogging. However, these resins are not sufficiently compatible with each other, the polyurethane resins are likely to ooze out onto the surface of the magnetic layer, and the durability thereof is reduced. In addition, a new problem is caused that a trouble is likely to be caused by sticking. Namely, since the polyurethane resins oozed out onto the surface of the magnetic layer are soft, the resins are scraped by heads and sticked on the heads to thereby cause clogging. When a tape is wound around a reel, there is caused a problem that the tape in the wound-up state is likely to be stuck together by the polyurethane resin oozed out onto the surface of the magnetic layer.

SUMMARY OF THE INVENTION

An object of the present invention is to provide a magnetic recording medium which is freed from the problems associated with the prior arts and is excellent in dispersibility, smoothness and electromagnetic characteristics.

Another object of the present invention is to provide a magnetic recording medium which has excellent running durability and hardly causes clogging in particular.

Still another object of the present invention is to provide a magnetic recording medium which hardly causes a trouble due to sticking even when stored over a long period of time.

These and other objects of the present invention have been achieved by (1) a magnetic recording medium comprising a nonmagnetic support having on at least one side thereof a magnetic layer comprising a ferromagnetic particle and a binder, wherein the binder comprises at least a polyvinyl acetal resin having a polar group and a polyurethane resin having a polar group; or (2) a magnetic recording medium comprising (a) a nonmagnetic support having on at least one side thereof at least one of a lower magnetic layer comprising a ferromagnetic particle and a binder and a nonmagnetic layer comprising a nonmagnetic particle and a binder and (b) an upper magnetic layer comprising a ferromagnetic particle and a binder provided thereon, wherein at least the binder contained in the upper magnetic layer comprises a polyvinyl acetal resin having a polar group and a polyurethane resin having a polar group.

DETAILED DESCRIPTION OF THE INVENTION

The present invention will be illustrated in greater detail below.

The present invention is characterized in that both the polyvinyl acetal resin and the polyurethane resin are those having a polar group.

Namely, the polar groups have an effect of improving the compatibility of the polyurethane resin with the polyvinyl acetal resin, an effect of further improving the dispersibility of ferromagnetic particle, an effect of improving the smoothness, an effect of preventing clogging and an effect of preventing a trouble by sticking.

The polyvinyl acetal resin does not generate HCl as compared with a vinyl chloride resin. Accordingly, the polyvinyl acetal resin has advantages in that the demagnetization of ferromagnetic particle can be reduced and heads hardly suffer from corrosion. Since the polyvinyl acetal resin has the vinyl alcohol moiety, the polyvinyl acetal resin is highly hydrophilic. In addition, the polyvinyl acetal resin used in the present invention has a polar group introduced thereinto, and hence a ferromagnetic particle can be highly adsorbed thereby. Further, a polar group is introduced into the polyurethane resin which itself highly adsorbs a ferromagnetic particle. The compatibility of the polyurethane resin with the polyvinyl acetal resin having a polar group is improved by introducing a polar group into the polyurethane resin. The present inventors have found that the above-described problems can be solved by improving the compatibility of the polyurethane resin with the polyvinyl acetal resin. These effects can be neither conceived nor expected from the conventional disclosures of the combinations of the polyurethane resins with the polyvinyl acetal resins. These effects have been for the first time achieved by the present inventors.

The magnetic recording medium of the present invention comprises at least a magnetic layer. The magnetic layer may have a multi-layer structure. A nonmagnetic layer may be provided between the magnetic layer and the nonmagnetic support. Accordingly, the term "magnetic layer" as used herein includes each layer of the multi-layer. When the magnetic layer is a multi-layer magnetic layer, a lower magnetic layer and an upper magnetic layer in this order are provided from the side of the nonmagnetic support.

When the magnetic layer has a multi-layer structure in the present invention, it is necessary that at least the uppermost layer contains at least the polyvinyl acetal resin having a polar group and the polyurethane resin having a polar group. Other magnetic layers or the nonmagnetic layers may optionally contain either one or both of them.

The polyvinyl acetal resin having a polar group used in the present invention may have any composition having repeating units derived from other monomers, so long as the polyvinyl acetal resin has at least a repeating unit derived from an acetal monomer unit and a polar group. The polar group is not particularly limited, and includes the conventional polar groups.

The polyvinyl acetal resin which can be preferably used in the present invention is a resin having a structure comprising monomer units represented by the following formula (I). The monomer units in formula (I) represent each unit of Unit a (vinyl acetal unit), Unit b (vinyl acetate (VAc) unit), Unit c (vinyl alcohol (VOH) unit) and Unit d (a polar group-containing monomer unit) from the left. However, the order of these units is not limited to the following order, and these units may be arranged in a different order. The structure of formula (I) is as follows:

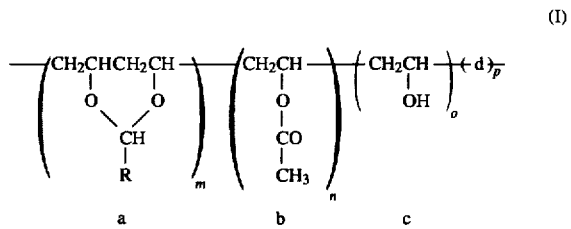

(I)

wherein m is 40 mol % or more, preferably from 50 to 80 mol %, and more preferably from 60 to 75 mol %; n is 10 mol % or less, preferably from 0 to 8 mol %, and more preferably from 0 to 5 mol %; o is 40 mol % or less, preferably from 5 to 38 mol %, and more preferably from 10 to 30 mol %; and p is 5 mol % or less, preferably from 0.01 to 3 mol %, and more preferably from 0.1 to 2 mol %, provided that m+n+o+p = 100 mol %.

R represents a hydrogen atom or an alkyl group having from 1 to 18 carbon atoms, wherein R may be a mixture of two or more alkyl groups in the same molecule or in different molecules. More preferably, R is a methyl group. When the number of the carbon atoms of R is increased, the dispersibility is reduced, and, further, the Tg is lowered and the durability is reduced. When the number of hydrogen atoms of R is increased, the solubility to solvents is lowered.

The resins represented by formula (I) have a degree of polymerization of from 100 to 1,000, preferably from 200 to 600, and more preferably from 250 to 500.

Examples of Unit d (the polar group-containing monomer unit) include a sodium vinylsulfonic acid unit and a sodium allylsulfonic acid unit.

Examples of the polar group of the polyvinyl acetal resin used in the present invention include —COOM, —SO$_3$M, —OSO$_3$M, —PO(OM')$_2$, —OPO(OM')$_2$, —NR$^1$R$^2$ and —N$^+$R$^1$R$^2$R$^3$X$^-$, wherein M represents H, Li Na or K; M' represents H, Li, Na, K or an alkyl group; R$^1$, R$^2$ and R$^3$ are the same or different and each represents a hydrogen atom or an alkyl group; and X represents a halogen atom. Two or more polar groups may be attached to the same molecule or different molecules. For example, at least two polar groups may be attached to the same group such as the residue of betaine.

The polyvinyl acetal resin having a polar group has the polar group in an amount of from $1\times10^{-6}$ to $1\times10^{-3}$ eq/g, preferably from $1\times10^{-5}$ to $5\times10^{-4}$ eq/g, and more preferably from $2\times10^{-5}$ to $2\times10^{-4}$ eq/g. When the amount of the polar group is more than the above upper limit, the viscosity is high and the dispersibility is lowered, while when the amount is less than the above lower limit, the dispersibility is lowered.

The weight average molecular weight (Mw) of the polyvinyl acetal resin is from 10,000 to 100,000, preferably from 20,000 to 80,000, and more preferably from 30,000 to 60,000.

The polyvinyl acetal resin has a Tg (E" peak temperature at 110 Hz of rheovibron) of from 50° to 130° C., preferably from 60° to 120° C., and more preferably from 70° to 110° C.

The polyvinyl acetal resin is used in an amount of from 25 to 90% by weight, preferably from 30 to 60% by weight, and more preferably from 35 to 55% by weight, based on the total amount of the entire binders (including a hardening agent).

The polyurethane resin having a polar group used in the present invention may have any composition having monomer units which do not contribute to the urethane bond, so long as the polyurethane resin has at least a diisocyanate monomer unit, a monomer unit capable of bonding to the urethane bond and a polar group. The polar group is not particularly limited, and includes conventional polar groups. Specific examples of the polar group include those already described above in the definition of the polar group which can be attached to the polyvinyl acetal resin. The polar group may be introduced into the polyurethane resin by using a monomer having a polar group. Alternatively, the polar group may be attached to a general polyurethane resin by an addition reaction.

The polyurethane resin having a polar group has a polar group in an amount of from $1\times10^{-6}$ to $1\times10^{-3}$ eq/g, preferably from $1\times10^{-5}$ to $5\times10^{-4}$ eq/g, and more preferably from $2\times10^{-5}$ to $2\times10^{-4}$ eq/g. When the amount of the polar group is more than the above upper limit, the viscosity is high and the dispersibility is lowered, while the amount is less than the above lower limit, the dispersibility is lowered.

The polyurethane resin having a polar group used in the present invention may be a polyurethane resin having at least a diisocyanate monomer unit, a monomer unit capable of bonding to the urethane bond and three or more —OH groups per molecule.

The —OH groups may be introduced into the polyurethane resin by using monomers having the —OH groups or by attaching the —OH groups to a general polyurethane resin by an addition reaction. Usually, the —OH groups are introduced into the polyurethane resin by reacting a polyol used as a chain lengthening agent with a carboxyl group containing compound or an NCO-terminated compound.

Examples of the chain lengthening agent include trimethylol propane, glycerol and ethylene oxide adducts thereof, 3-methylpentane-1,3,5-triol, 1,2,6-hexanetriol, pentaerythritol and dipentaerythritol.

The polyurethane resin used in the present invention may have at least three —OH groups, preferably from 3 to 20 —OH groups, and more preferably from 3 to 10 —OH groups, per molecule.

When the number of the —OH groups is more than 20, the viscosity is high and the dispersibility is lowered, while the number of the —OH groups is less than 3, the dispersibility is lowered.

The polyurethane resin having a polar group used in the present invention may have any of conventional skeletal structures. Examples of the skeletal structures which can be preferably used for the polyurethane resin having a polar group used in the present invention include a polyester polyurethane structure, a polyether polyurethane structure, a polyether polyester polyurethane structure, a polycarbonate polyurethane structure, a polyester polycarbonate polyurethane structure and a polycaprolactone polyurethane structure.

Any of conventional isocyanates can be used in the present invention. Examples of the isocyanates which can be preferably used in the present invention include MDI (diphenylmethane-4,4'-diisocyanate), TDI (tolylene diisocyanate), XDI (xylylene diisocyanate) and IPDI (isophorone diisocyanate).

The polyurethane resin has a weight average molecular weight (Mw) of from 10,000 to 200,000, preferably from 20,000 to 70,000, and more preferably from 30,000 to 60,000.

The polyurethane resin has a Tg (E" peak temperature at 110 Hz of rheovibron manufactured by ORIENTEC CO., LTD.) of from $-40°$ to $100°$ C., preferably from $20°$ to $60°$ C., and more preferably from $25°$ to $55°$ C.

Examples of the polyurethane resin which can be preferably used in the present invention and the monomer compositions thereof include the following resins and monomer compositions:

1) Weight Average Molecular Weight (Mw): 10,000 to 100,000;

Tg: $25°$ to $55°$ C.;

—OH group (three —OH groups per molecule);

Monomer Composition:
   Butanediol Adipate Polyester Polyol

Weight Average Molecular Weight:
   500 to 3,000, preferably 1,000 to 2,000

Neopentyl Glycol

Dihydroxyethyl 5-Sodiumsulfoisophthalate

Diphenylmethane Diisocyanate (MDI)

Trimethylolpropane; or

2) Weight Average Molecular Weight (Mw): 10,000 to 100,000;

Tg: $25°$ to $55°$ C.;

—OH group (four OH groups per molecule);

Monomer Composition:
   Butanediol Adipate Polyester Polyol Weight Average Molecular Weight:
   500 to 3,000 preferably 1,000 to 2,000

Neopentyl Glycol

Dihydroxyethyl 5-Sodiumsulfoisophthalate

Diphenylmethane Diisocyanate (MDI)

Pentaerythritol

The composition ratio in the above monomer compositions can be chosen so as to provide the resins having a Tg which is within the above temperature range.

The polyurethane resin having a polar group is used in an amount of from 10 to 50% by weight, preferably from 20 to 40% by weight, and more preferably 24 to 35% by weight, based on the total amount of the entire binders (including a hardening agent).

The polyvinyl acetal resin having a polar group and the polyurethane resin having a polar group may be used optionally together with other resins. Examples of the resin used as a binder include a thermoplastic resin, a thermosetting resin, a reactive resin and a mixture thereof which are conventionally used. The thermoplastic resin preferably has a glass transition temperature of from $-100°$ to $150°$ C., a number-average molecular weight of from 1,000 to 200,000, more preferably 10,000 to 100,000, and a polymerization degree of about 50 to 1,000. Examples of the thermoplastic resin include a polymer or copolymer containing a structural unit derived from vinyl chloride, vinyl acetate, vinyl alcohol, maleic acid, acrylic acid, acrylic acid ester, vinylidene chloride, acrylonitrile, methacrylic acid, methacrylic ester, styrene, butadiene, ethylene, vinyl butyral, vinyl acetal or vinyl ether; a polyurethane resin; and various rubber-type resins. Examples of suitable thermosetting or reactive resins include a phenolic resin, an epoxy resin, a thermosetting polyurethane resin, a urea resin, a melamine resin, an alkyd resin, a reactive acrylic resin, a formaldehyde resin, a silicone resin, an epoxy-polyamide resin, a mixture of a polyester resin and an isocyanate prepolymer, a mixture of a polyester polyol and a polyisocyanate, and a mixture of a polyurethane and a polyisocyanate.

These resins are described in detail in *Plastic Handbook* published by Asakura Shoten, Japan. A conventional electron beam-curing type resin may be used as a binder. Examples of the resins and the production process therefor are described in detail in JP-A-62- 256219. The above-mentioned resins can be used alone or in combination.

The above-described polar group may be introduced into any of the resins described above. The amount of such polar group is from $10^{-1}$ to $10^{-8}$ eq/g, preferably from $10^{-2}$ to $10^{-6}$ eq/g.

Specific examples of the binder used in the present invention include VAGH, VYHH, VMCH, VAGF, VAGD, VROH, VYES, VYNC, VMCC, XYHL, XYSG, PKHH, PKHJ, PKHC and PKFE manufactured by Union Carbide Co., Ltd.; MPR-TA, MPR-TA5, MPR-TAL, MPR-TSN, MPR-TMF, MPR-TS, MPR-TM and MPR-TAO manufactured by Nisshin Chemical Industry Co., Ltd.; 1000W, DX80, DX81, DX82, DX83 and 100FD manufactured by Denki Kagaku Kogyo K.K.; MR-105, MR110, MR100 and 400X-110A manufactured by Nippon Zeon Co., Ltd.; Nippollan N2301, N2302 and N2304 manufactured by Nippon Polyurethane Co., Ltd.; Pandex T-5105, T-R3080, T-5201, Burnock D-400, D-210-80, Crisvon 6109 and 7209 manufactured by Dainippon Ink & Chemicals, Inc.; Vylon UR8200, UR8300, UR8600, UR5500, UR4300, RV530 and RV280 manufactured by Toyobo Co., Ltd.; Daipheramine 4020, 5020, 5100, 5300, 9020, 9022 and 7020 manufactured by Dainichiseika Colour & Chemicals Mfg. Co., Ltd.; MX5004 manufactured by Mitsubishi Kasei Corporation; Sunprene SP-150 manufactured by Sanyo Chemical Industries, Co., Ltd.; and Salan F310 and F210 manufactured by Asahi Chemical Industry Co., Ltd.

The amount of such resins is 30% by weight based on the total amount of the entire binders.

Polyisocyanate may be used as a hardening agent in the present invention.

Examples of the polyisocyanate used as a hardening agent in the present invention include isocyanates such as tolylene diisocyanate, diphenylmethane- 4,4'-diisocyanate, hexamethylene diisocyanate, xylylene diisocyanate, naphthylene-1,5-diisocyanate, o-toluidine diisocyanate, isophorone diisocyanate and triphenylmethane triisocyanate; products of the reactions of the above-mentioned isocyanates with polyalcohol; and polyisocyanates formed through condensation of isocyanates. Specific examples of the isocyanates used in the present invention include the isocyanates which are commercially available under the trade names of Coronate L, Coronate HL, Coronate 2030, Coronate 2031, Coronate 3041, Millionate MR and Millionate MTL manufactured by Nippon Polyurethane Co., Ltd.; Takenate D-102, Takenate D-110N, Takenate D-200 and Takenate D-202 manufactured by Takeda Chemical Industries, Ltd.; and Desmodure L, Desmodure IL, Desmodure N and Desmodure HL manufactured by Sumitomo Bayer Co., Ltd. The polyisocyanate may be used alone or in combinations of two or more polyisocyanates in order to take advantage of a difference in curing reactivity between the polyisocyanates.

The polyisocyanates used as a binder in the present invention are used in an amount of from 10 to 40% by weight, preferably from 15 to 35% by weight, and more preferably from 20 to 30% by weight, based on the total amount of the entire binders.

The binders used in the magnetic layer of the present invention are used in an amount of from 10 to 50% by weight, preferably from 15 to 35% by weight, based on the amount of the ferromagnetic particle therein.

The binders used in the nonmagnetic layer of the present invention are used in an amount of from 10 to 50% by weight, preferably from 15 to 35% by weight, based on the amount of the nonmagnetic particle therein.

In the present invention, the amount of the binders, the amounts, molecular weights and polar group amounts of the polyvinyl acetal resin having a polar group, the polyurethane resin having a polar group, the polyisocyanates and other resins in the binders, and the physical properties of the resins described above can be varied among the nonmagnetic layers and the magnetic layers, if desired.

Examples of the ferromagnetic particle used in the magnetic layer of the present invention include $\gamma$-FeOx (x=1.33 to 1.5), Co-modified $\gamma$-FeOx (x=1.33 to 1.5), a ferromagnetic alloy particle mainly comprising Fe, Ni or Co (75% by weight or more), and conventional ferromagnetic particle such as barium ferrite and strontium ferrite. Among these, preferred is a ferromagnetic alloy particle. Besides the atoms specified above, the ferromagnetic particle may contain other atoms such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pt, Nd, P, Co, Mn, Zn, Ni, Sr and B. Before being dispersed, the ferromagnetic particle may be treated with, for example, a dispersant, a lubricant, a surfactant, or an antistatic agent which will be described later. Specific treatments are described in, for example, JP-B-44-14090, JP-B-45-18372, JP-B-47- 22062, JP-B-47-22513, JP-B-46-28466, JP-B-46-38755, JP -B-47-4286, JP-B-47-12422, JP-B-47-17284, JP-B-47-18509, JP-B-47-18573, JP-B-39-10307, JP-B-48-39639, and U.S. Pat. Nos. 3,026,215, 3,031,341, 3,100,194, 3,242,005 and 3,389,014.

In the ferromagnetic particles, the ferromagnetic alloy particle may contain a small amount of a hydroxide or oxide. Conventional methods may be used to prepare the ferromagnetic particle used in the present invention. Examples of the methods include: reduction with an organic acid double salt (mainly comprising an oxalate) and a reducing gas, such as hydrogen; reducing iron oxide with a reducing gas, such as hydrogen, to obtain Fe or Fe-Co particles or the like; pyrolyzing a metal carbonyl compound; reduction by adding a reducing agent, such as sodium boron hydride, a hypophosphite, or hydrazine to an aqueous solution of a ferromagnetic metal; vaporizing a metal in a low-pressure inert gas to obtain fine particles. The ferromagnetic alloy particles may be used after being subjected to a conventional gradual oxidation treatment. This treatment may be conducted using any of the following methods: immersing the particles in an organic solvent, followed by drying; immersing the particles in an organic solvent and feeding an oxygen-containing gas to form an oxide film on the surfaces, followed by drying; forming an oxide film on the surfaces of the ferromagnetic alloy particles by controlling the partial pressures of oxygen gas and an inert gas, without using an organic solvent.

The ferromagnetic particle used in the magnetic layer of the present invention has a specific surface area as determined by the BET method of from 25 to 80 $m^2/g$, preferably from 40 to 70 $m^2/g$. When the specific surface area is less than 25 $m^2/g$, it is not preferable because of increased noise results, while when the specific surface area is more than 80 $m^2/g$, it is not preferable because the good surface properties are difficult to obtain. The crystallite size of the ferromagnetic particle used in the magnetic layer is from 100 to 450 Å, preferably from 100 to 350 Å. The $\sigma_s$ (saturated magnetization) of the magnetic iron oxide particle is 50 emu/g or more, preferably 70 emu/g or more, while the $\sigma_s$ of the ferromagnetic metal particle is preferably 100 emu/g or more, more preferably 110 emu/g or more and most preferably from 120 to 170 emu/g. The coercive force thereof is preferably from 1,100 to 2,500 Oe, more preferably from 1,400 to 2,000 Oe. The aspect ratio of the ferromagnetic particle is preferably 18 or less, more preferably 12 or less.

Preferably, the ferromagnetic particle has an r1500 value of 1.5 or less, more preferably 1.0 or less, where r1500 indicates the percent retention of magnetization remaining uninverted when, after the magnetic recording medium is subjected to a saturated magnetization, it is subjected to a magnetization of a magnetic field of 1,500 Oe (oersted) in the opposite direction.

Preferably, the water content of the ferromagnetic particle is from 0.01 to 2% by weight, however, it is preferred to optimize the water content of the ferromagnetic particle according to the kind of binder. The tap density of γ-iron oxide is preferably 0.5 g/ml or more, more preferably 0.8 g/ml or more. The tap density of the alloy particle is preferably from 0.2 to 0.8 g/ml, and when it is more than 0.8 g/ml, an oxidation during compacting of the alloy particle is accelerated, so that a sufficient saturated magnetization ($\sigma_s$) is difficult to obtain. On the other hand, it is less than 0.2 g/ml, insufficient dispersion of the ferromagnetic particle may result.

When γ-iron oxide is used, the percentage of divalent iron to trivalent iron is preferably from 0 to 20% by weight, more preferably from 5 to 10% by weight. Further, the amount of cobalt atoms is from 0 to 15% by weight, preferably from 2 to 8% by weight, based on the amount of iron atoms.

Preferably, the pH of the ferromagnetic particle is optimized according to the binder used in combination therewith. The pH thereof is from 4 to 12, preferably from 6 to 10. If desired, the ferromagnetic particle may be surface-treated with Al, Si, P, or an oxide or other compound thereof. The amount of such treating agent is preferably from 0.1 to 10% by weight based on the weight of the ferromagnetic particle. This surface treatment is advantageous in that it reduces lubricant (e.g., a fatty acid) adsorption to 100 mg/m$^2$ or less. The ferromagnetic particle may contain a soluble inorganic ion, such as Na, Ca, Fe, Ni and Sr. This does not substantially affect the properties of the ferromagnetic particle so long as the concentration thereof is 500 ppm or less.

It is preferred that the void content of the ferromagnetic particle used in the present invention is lower. It is preferably 20% by volume or less, more preferably 5% by volume or less. The ferromagnetic particle may have any shape of an acicular shape, a spherical shape, a polyhedral shape and a plate-like shape, so long as the particle size thereof can satisfy the required characteristics. The switching field distribution (SFD) of the ferromagnetic particle is preferably 0.6 or less, and it is necessary that the ferromagnetic particle has a narrow coercive force (Hc) distribution to obtain the SFD of 0.6 or less. This can be effected by improving the particle size distribution of goethite, preventing γ-hematite from being sintered, or retarding the deposition rate of cobalt when cobalt-modified iron oxide is prepared.

The particle of platy hexagonal ferrite such as barium ferrite, strontium ferrite, lead ferrite, calcium ferrite and Co-substituted products thereof and the hexagonal Co particle can be used in the present invention. More specifically, magnetoplumbite type barium ferrite, magnetoplumbite type strontium ferrite, magnetoplumbite barium ferrite having partially a spinel phase and magnetoplumbite strontium ferrite having partially a spinel phase can be used. Barium ferrite and strontium ferrite are more preferred. Elements such as Co-Ti, Co-Ti-Zr, Co-Ti-Zn, Ni-Ti-Zn or Ir-Zn may be added to the hexagonal ferrites to control a coercive force.

The hexagonal ferrite is usually a hexagonal platy particle. The particle diameter thereof indicates the width of the plate of the hexagonal platy particle, and can be measured by an electron microscope. It is preferred that the particle size is from 0.01 to 0.2 μm, preferably from 0.03 to 0.1 μm, in the present invention. The average thickness (plate thickness) of the particle is from 0.001 to 0.2 μm, preferably from 0.003 to 0.05 μm. The platy ratio (particle diameter/platy thickness) is from 1 to 10, preferably from 3 to 7. The hexagonal ferrite particle has a specific surface area (SBET) Of preferably from 25 to 70 m$^2$/g as measured by the BET method.

The magnetic layer and the nonmagnetic layer of the present invention may optionally contain various nonmagnetic particles. When the nonmagnetic particle is applied to the magnetic layer, the effect of reinforcing the strength of the magnetic film by an interaction with abrasive function and the binder can be obtained. When the nonmagnetic particle is applied to the nonmagnetic layer, the various functions of the magnetic layer, such as thinning of the magnetic layer and higher density recording, can be obtained.

Examples of the nonmagnetic particle which can be preferably used in the present invention include alumina, chromium oxide, red oxide, silicon carbide and titanium oxide. The nonmagnetic particle may be used either alone or in combination with other one or more nonmagnetic particles. When the nonmagnetic particle is applied to the magnetic layer or the nonmagnetic layer, it is preferred that they are properly chosen by taking the physical properties (e.g., particle size, particle form, tap density, Mohs' hardness) thereof into consideration.

Examples of the nonmagnetic particle used in the nonmagnetic layer of the present invention include metal, metal oxide, metal carbonate, metal sulfate, metal nitride, metal carbide and metal sulfide. Specific examples thereof include TiO$_2$ (rutile, anatase), TiOx, cerium oxide, tin oxide, tungsten oxide, ZnO, ZrO$_2$, SiO$_2$, Cr$_2$O$_3$, α-alumina having an α-alumina structure content of 90% or more, β-alumina, γ-alumina, α-iron oxide, goethite, corundum, silicon nitride, titanium carbide, magnesium oxide, boron nitride, molybdenum disulfide, zinc oxide, MgCO$_3$, CaCO$_3$, BaCO$_3$, SrCO$_3$, BaSO$_4$ and silicon carbide. The nonmagnetic particle may be used alone or in combination with other one or more nonmagnetic particles. The shape and size of the nonmagnetic particle are not particularly limited. Accordingly, two or more different nonmagnetic particles may be combined if desired, and one kind of nonmagnetic particle can be used if the particle diameter distribution thereof is suitably selected. When the particle has a spherical shape, the particle size thereof is from 0.005 to 1 μm, preferably from 0.8 to 0.01 μm. When the particle has an acicular shape, the long axis length thereof is from 0.01 to 3 μm, preferably from 0.05 to 1 μm, and the acicular ratio thereof is from 1/15 to 1/1, preferably from 1/12 to 1/2. The tap density thereof is from 0.05 to 2 g/ml, preferably from 0.2 to 1.5 g/ml. The water content thereof is from 0.1 to 5% by weight, preferably from 0.2 to 3% by weight. The pH thereof is from 2 to 11. The oil absorption thereof as measured with DBP is from 5 to 100 ml/100g, preferably from 10 to 80 ml/100g, and more preferably from 20 to 60 ml/100g. The nonmagnetic particle is not necessarily 100% pure, and, if desired, it may be surface-treated with other compound such as Al, Si, Ti, Zr, Sn, Sb and Zn compounds to form the oxide thereof on the surface. When the nonmagnetic particle is surface-treated, the purity of the nonmagnetic particle is preferably 70% by weight or more so as not to reduce the effect of the present invention. The ignition loss is preferably 20% by weight or less.

Specific examples of the nonmagnetic particle used in the present invention include UA5600 and UA5605 manufactured by Showa Denko K.K.; AKP-20 and AKP-30 manufactured by Sumitomo Chemical Co., Ltd.; and Y-LOP manufactured by Titan Kogyo K.K. and the particle by calcining it.

The nonmagnetic particle used in the present invention is preferably titanium oxide, more preferably titanium dioxide. Either a rutile type or an anatase type is used according to the nucleating agent added during hydrolysis.

Carbon black may be incorporated into the lower nonmagnetic layer whereby the known effect of reducing $R_s$ (surface resistivity) can be produced. Examples of the carbon black include furnace black for rubbers, thermal black for rubbers, coloring black and acetylene black. The specific surface area of the carbon black is from 100 to 500 $m^2/g$, the DBP oil absorption thereof is from 20 to 400 ml/100g, the particle diameter thereof is from 5 to 80 mµ, the pH thereof is from 2 to 10, the water content thereof is from 0.1 to 10%, and the tap density thereof is from 0.1 to 1 g/ml. Specific examples of the carbon blacks used in the present invention include BLACKPEARLS manufactured by Cabot Co., Ltd.; #3050B manufactured by Mitsubishi Kasei Corporation; CONDUCTEX SC manufactured by Columbian Carbon Co., Ltd.; 8800 manufactured by RAVEN CO., LTD.; and Ketjen Black EC manufactured by Akzo Corp. The carbon black may be surface-treated with a dispersant or other agent or grafted with a resin. The carbon black whose surfaces have been partly graphitized may also be used. Further, the carbon black may be dispersed in a binder before added to a coating solution. The carbon black may be used alone or in combination with other one or more carbon blacks.

With respect to the carbon black used in the present invention, reference may be made to, for example, *Carbon Black Binran (Carbon Black Handbook)*, edited by Carbon Black Association, Japan.

Nonmagnetic organic particle can be used in the nonmagnetic layer if desired. Examples of the nonmagnetic organic particle include an acrylic-styrene resin particle, a benzoguanamine resin particle, a melamine resin particle, a phthalocyanine pigment, a polyolefin resin particle, a polyester resin particle, a polyamide resin particle, a polyimide resin particle, and a polyethylene fluoride resin particle. For producing these organic particles, disclosures described in JP-A-62-18564 and JP-A-60-255827 can be referred to.

The nonmagnetic particles described above are usually used in a weight ratio of from 0.1 to 20 and a volume ratio of from 0.1 to 10 each based on the amount of the binders.

It should be noted that although an undercoating layer is provided in conventional magnetic recording media, such undercoating layer, which has a thickness of 0.5 µm or less, improves adhesion between the support and the magnetic or other layers and is different from the lower nonmagnetic layer of the present invention. In the present invention, a conventional undercoating layer may be provided in order to improve adhesion between the lower nonmagnetic layer and the support.

Examples of the abrasive used in the present invention include the conventional material having Mobs' hardness of 6 or more such as α-alumina having an α-conversion of 90% or more, β-alumina, silicon carbide, chromium oxide, cerium oxide, α-iron oxide, corundum, artificial diamond, silicon nitride, silicon carbide, titanium carbide, titanium oxide, silicon dioxide and boron nitride. The abrasive is used alone or in combination with other one or more abrasives. A composite of two or more of abrasives (one abrasive obtained by surface treatment with another abrasive) may also be used. The abrasive may contain other compounds or elements, provided that the abrasive content is 90% by weight or more. Preferably, the abrasive has a particle size of 0.01 to 2 µm. If desired, abrasives having different particle sizes may be used in combination, or a single abrasive having a wide particle diameter distribution may be used. Preferably, the abrasive has a tap density of 0.3 to 2 g/ml, a water content of 0.1 to 5% by weight, a pH of 2 to 11, and a specific surface area ($S_{BET}$) of 1 to 30 $m^2/g$. The abrasive may have any shape of an acicular shape, a spherical shape and a dice-like shape, and the abrasive having a shape partly containing jags is preferred because it has high abrasivity.

Examples of the abrasive include AKP-20, AKP-30, AKP-50, HIT-50 and HIT-55 manufactured by Sumitomo Chemical Co., Ltd.; G5, G7 and S-1 manufactured by Nippon Chemical Industrial Co., Ltd.; and TF-100, TF- 140, 100ED and 140ED manufactured by Toda Kogyo Co., Ltd. If desired, the kind, amount and combination of the abrasives used in the present invention may be varied among the magnetic layers and the nonmagnetic layers. The abrasive may be dispersed in a binder before added to a magnetic coating solution. Preferably, the number of abrasive material particles present on the magnetic layer surface and on the magnetic layer edges in the magnetic recording medium of the present invention is 5 abrasives per 100 $µm^2$ or more.

Examples of the carbon black used in the magnetic layer include furnace black for rubbers, thermal black for rubbers, coloring black and acetylene black. Preferably, the carbon black used in the magnetic layer has a specific surface area of 5 to 500 $m^2/g$, a DBP absorption of 10 to 400 ml/100 g, an average particle diameter of 5 to 300 mµ, a pH of 2 to 10, a water content of 0.1 to 10% by weight, and a tap density of 0.1 to 1 g/ml. Specific examples of the carbon black used in the magnetic layer include BLACKPEARLS 2000, 1300, 1000, 900, 800, 700 and VULCAN XC-72 manufactured by Cabot Co., Ltd.; #80, #60, #55, #50 and #35 manufactured by Asahi Carbon Co., Ltd.; #2400B, #2300, #900, #1000, #30, #40 and #10B manufactured by Mitsubishi Kasei Corporation; CONDUCTEX SC manufactured by Columbian Carbon Co., Ltd.; and 150, 50, 40 and 15 manufactured by RAVEN CO., LTD. The carbon black may be surface-treated with a dispersant or other agent or grafted with a resin. The carbon black whose surfaces have been partly graphitized may also be used. Before the carbon black is added to a magnetic coating solution, it may be in advance dispersed with a binder. The carbon black may be used alone or in combination. Preferably, the carbon black is preferably used in the magnetic layer in an amount of from 0.1 to 30% by weight based on the weight of the ferromagnetic particle. The carbon black in the magnetic layer functions to prevent electrification in the magnetic layer; to reduce the coefficient of friction of the magnetic layer; to add shading ability; and to improve the strength of the magnetic layer. The kind of carbon black used in the present invention will vary the foregoing effects and the degree of the foregoing effects. If desired, the kind, amount and combination of the carbon blacks may be varied between the upper magnetic layer and the lower magnetic layer according to the above-described properties such as the particle size, the oil absorption, the electrical conductivity and the pH. With respect to the carbon black used in the magnetic layer of the present invention, reference may be made to, for example, *Carbon Black Binran (Carbon Black Handbook)*, edited by Carbon Black Association, Japan.

As other additives used in the magnetic layer or the nonmagnetic layer of the present invention, additives having an effect such as lubricating, antistatic, dispersing and plasticizing effects are used. Examples of the additives include molybdenum disulfide, tungsten disulfide, graphite, boron nitride, graphite fluoride, silicone oil, silicone having a polar group, fatty acid-modified silicone, fluorinated silicone, fluorinated alcohol, fluorinated ester, polyolefin, polyglycol, ester of alkylphosphoric acid and alkali metal salt thereof, ester of alkylsulfuric acid and alkali metal salt thereof, polyphenyl ether, ester of fluoroalkylsulfuric acid and alkali metal salt thereof, monobasic fatty acid having from 10 to 24 carbon atoms (which may have an unsaturated bond or be branched) and metal (e.g., Li, Na, K, Cu) salt thereof, mono-, di-, tri-, tetra-, penta-, and hexahydric alcohol having from 12 to 22 carbon atoms (which may have an unsaturated bond or be branched), alkoxyalcohol having from 12 to 22 carbon atoms, mono-, di-, or tri(fatty acid) ester including a monobasic fatty acid having from 10 to 24 carbon atoms (which may have an unsaturated bond or be branched) and one of mono-, di-, tri-, tetra-, penta-, and hexahydric alcohol having from 2 to 12 carbon atoms (which may have an unsaturated bond or be branched), fatty acid ester of monoalkyl ether of alkylene oxide polymer, fatty acid amide having from 8 to 22 carbon atoms, and aliphatic amine having from 8 to 22 carbon atoms. Specific examples thereof include lauric acid, myristic acid, palmitic acid, stearic acid, behenic acid, butyl stearate, oleic acid, linoleic acid, linoleic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol and lauryl alcohol.

In addition, a nonionic surfactant (e.g., alkylene oxide, glycerine, glycidol, alkylphenol ethylene oxide adduct); a cationic surfactant (e.g., cyclic amine, ester amide, quaternary ammonium salt, hydantoin derivative, heterocyclic compound, phosphonium or sulfonium compound), an anionic surfactant containing an acid group, such as carboxylic acid, sulfonic acid, phosphoric acid, sulfate and phosphate groups, and an amphoteric surfactant (e.g., amino acid, aminosulfonic acid, ester of sulfuric or phosphoric acid with aminoalcohol, alkylbetaine) can be used. Suitable surfactants for use in the present invention are described in detail in *Kaimen Kasseizai Binran (Surfactant Handbook)* (published by Sangyo Tosho K. K., Japan). The additives, including lubricants and antistatic agents, are not necessarily 100% pure, and may contain impurities such as isomers, unreacted raw materials, by-products, decomposition products and oxidation products. Preferably, the impurities content is 30% by weight or less, more preferably 10% by weight or less.

If desired, the kind, amount and combination of lubricants or surfactants may be varied among the magnetic layers and the nonmagnetic layers. For example, a fatty acid having a certain melting point may be used in the nonmagnetic layer and a different fatty acid having a different melting point may be used in the magnetic layer to control migration to the surface. Similarly, an ester having a certain boiling point or polarity may be used in the nonmagnetic layer and an ester having a different boiling point or polarity may be used in the magnetic layer to also control migration to the surface. A certain amount of a surfactant may be used in the nonmagnetic layer and a different amount of surfactant may be used in the magnetic layer to improve coating stability; also, the amount of a lubricant in the nonmagnetic layer may be more than that of the magnetic layer to improve lubricating effect. It is a matter of course that the methods using lubricants or surfactants are not limited to these examples. Part or all of the additives used in the present invention may be added at any step in the coating solution preparation process. For example, the additives may be mixed with the ferromagnetic particle prior to kneading steps; may be added during the kneading of the ferromagnetic particle with a binder and a solvent; may be added during dispersing steps; may be added after dispersion; or may be added to a coating solution immediately before coating.

Examples of the lubricant used in the present invention include NAA-102, Castor oil-cured fatty acid, NAA-42, Cation SA, Nymeen L-201, Nonion E-208, Anon BF, Anon LG, Butyl stearate, Butyl laurate ande Erucic acid manufactured by Nippon Oil & Fats Co., Ltd.; Oleic acid manufactured by Kanto Chemical Co., Ltd.; FAL-205 and FAL-123 manufactured by Takemoro Yushi Co., Ltd.; Enujerub LO manufactured by Shin Nihon Rika Co., Ltd.; TA-3 manufactured by Shin-Etsu Chemical Co., Ltd.; Armide P manufactured by Lion Armer Co., Ltd.; Duomine TDO manufactured by Lion Fat and Oil Co., Ltd.; BA-41G manufactured by Nisshin Oil Mills Co., Ltd.; and Profan 2012E, Newpole PE61 and Ionet MS-400 manufactured by Sanyo Chemical Industries, Ltd.

Examples of the organic solvent used in the present invention include ketone (e.g., acetone, methyl ethyl ketone, methyl isobutyl ketone, diisobutyl ketone, cyclohexanone, isophorone, tetrahydrofuran), alcohol (e.g., methanol, ethanol, propanol, butanol, isobutyl alcohol, isopropyl alcohol, methylcyclohexanol), ester (e.g., methyl acetate, butyl acetate, isobutyl acetate, isopropyl acetate, ethyl lactate, glycol acetate), glycol ether (e.g., glycol dimethyl ether, glycol monoethyl ether, dioxane), aromatic hydrocarbon (e.g., benzene, toluene, xylene, cresol, chlorobenzene), chlorinated hydrocarbon (e.g., methylene chloride, ethylene chloride, carbon tetrachloride, chloroform, ethylene chlorohydrin, dichlorobenzene) and other compounds (e.g., N,N-dimethylformamide, hexane). These solvents may be used in any suitable amount. The organic solvent used in the invention is not necessarily 100% pure, and may contain impurities such as isomers, unreacted raw materials, by-products, decomposition products, oxidation products and water. Preferably, the impurities content is 30% by weight or less, more preferably 10% by weight or less. Preferably, the organic solvents used in the magnetic layer in the present invention are the same as the organic solvents used in the nonmagnetic layer. Different solvent amounts may be used among the magnetic layers and the nonmagnetic layers. Preferably, the solvent having higher surface tensions (e.g., cyclohexanone and dioxane) is used for the nonmagnetic layer in order to enhance the coating stability. Specifically, the arithmetic mean for surface tensions of the upper layer solvents should be not higher than that for surface tensions of the lower layer solvents. The solvent which is polar to some degree is preferred in order to improve dispersibility, and a solvent composition having 15 or more of one or more solvents having a dielectric constant of 15 or more is preferred. The solubility parameter is preferably from 8 to 11.

The magnetic recording medium according to the first embodiment of the present invention comprises a nonmagnetic support of from 1 to 100 μm, preferably from 6 to 20 μm, and a magnetic layer of from 0.05 to 10 μm, preferably from 0.08 to 6 μm, more preferably from 0.1 to 4 μm. The magnetic recording medium according to the second embodiment of the present invention comprises a lower magnetic layer of from 1 to 10 μm, preferably from 2 to 5 μm, more preferably of 2.5 to 4 μm and an upper magnetic layer of from 0.05 to 5 μm, preferably from 0.08 to 2 μm, more preferably from 0.1 to 1 μm when the lower layer is a magnetic layer, and comprises a nonmagnetic layer of from 1 to 10 μm, preferably 2 to 5 μm, more preferably from 2.5 to 4 μm and an upper magnetic layer of from 0.05 to 5 μm, preferably from 0.08 to 2 μm, more preferably from 0.1 to 1 μm when the lower layer is a nonmagnetic layer. The total thickness of the upper layer and the lower layer is from 1/100 to 2 times the thickness of the nonmagnetic support. An undercoating layer may be provided between the nonmagnetic support and the lower layer in order to improve adhesion. The thickness of this undercoating layer is from 0.01 to 2 μm, preferably from 0.02 to 0.5 μm. Further, a back coating layer may be provided on the nonmagnetic support on the side opposite to the magnetic layer. The thickness of this back coating layer is from 0.1 to 2 μm, preferably from 0.3 to 1.0 μm. Such an undercoating layer and a back coating layer may be conventional ones.

The nonmagnetic support used in the present invention may be any suitable conventional film. Examples of the film material include polyester (e.g., polyethylene terephthalate, polyethylene naphthalate), polyolefin, cellulose triacetate, polycarbonate, polyamide, polyimide, polyamideimide, polysulfone, aramid and aromatic polyamide. The support may be subjected to corona discharge treatment, plasma treatment, adhesion-promoting treatment, heat treatment, dust-removing treatment. In order to attain the object of the present invention, it is necessary to employ the nonmagnetic support having a central line average surface roughness according to JIS B 0601 of 0.03 μm or less, preferably 0.02 μm or less, more preferably 0.01 μm or less. In addition to the requirement of low central average surface roughness, the nonmagnetic support is preferably free from projections of 1 μm or more. Surface roughness of the support can be controlled by changing the size and amount of filler incorporated into the support if required.

The thermal shrinkage of the support in the tape running direction and in the tape width direction are both preferably 3% or less, more preferably 1.5% or less, at 100° C. and 30 minutes, and are preferably 1% or less, more preferably 0.5% or less, at 80° C. and 30 minutes. The break strength of the modulus in the tape running direction and tape width directions is preferably from 5 to 100 kg/mm² and from 100 to 2,000 kg/mm², respectively.

The process for preparing a magnetic coating solution to be used for producing the magnetic recording medium of the present invention includes at least a kneading step and a dispersing step, and may further include a mixing step that may be conducted, if desired, before and after the kneading and dispersing steps. Each step may include two or more stages. Each of the materials for use in the present invention, including the ferromagnetic particle, the binder, the carbon black, the abrasive, the antistatic agent, the lubricant, and the solvent, may be added in any step either at the beginning of or during the step. Further, the individual raw materials may be added in portions in two or more steps. For example, portions of a polyurethane may be in each of the kneading step, the dispersing step, and the mixing step of adjusting the viscosity of the resulting dispersions.

Conventional manufacturing techniques can be used in order to prepare magnetic recording medium in accordance with the present invention. However, use of a kneading machine having high kneading power, such as a continuous kneader or a pressure kneader, in the kneading step produces a magnetic recording medium in accordance with the present invention and having a high residual magnetic flux density ($B_r$). In a continuous kneader or a pressure kneader, the ferromagnetic particle may be kneaded with all or part (preferably 30% by weight or more) of the binder, and the amount of the binder is from 15 to 500 parts by weight based on 100 parts by weight of the ferromagnetic particle. A suitable kneading treatment is described in, for example, JP-A-1-106338 and JP-A-64-79274. The use of a dispersion medium having a high specific gravity is preferred when preparing a coating solution for the lower nonmagnetic layer. A preferred dispersion medium is zirconia beads and metal beads.

Exemplary coating apparatuses and methods for producing multilayered magnetic recording media in accordance with the present invention are as follows:

1. a lower layer may first be applied with a coating apparatus commonly used for applying magnetic coating solution, e.g., a gravure coating apparatus, a roll coating apparatus, a blade coating apparatus, or an extrusion coating apparatus, and an upper layer is then applied, while the lower layer is in a wet state, by means of a support-pressing extrusion coater, such as those disclosed in JP-B-1-46186, JP-A-60-238179, and JP -A-2-265672;

2. an upper layer and a lower layer may be applied almost simultaneously using a single coating head having therein two slits for coating solutions, such as those disclosed in JP-A-63-88080, JP-A-2-17971, and JP-A-2-265672; or 3. an upper layer and a lower layer may be applied almost simultaneously with an extrusion coater equipped with a back-up roll, such as that disclosed in JP-A-2-174965.

Preferably, shearing is applied to a coating solution for the magnetic layer in order to prevent the electromagnetic characteristics and other properties of the magnetic recording medium from being impaired by aggregation of magnetic particles. Preferably, shearing is applied to such a coating fluid while in a coating head by a method such as those disclosed in JP-A-62- 95174 and JP-A-1-236968. Preferably, the viscosity of each coating solution should satisfy the range as specified in JP-A-3-8471.

A solenoid having 1,000 G or more and a cobalt magnet having 2000 G or more are used in combination. Further, a proper drying step is preferably provided before orientation so that the orientation of the magnetic recording medium can reach its highest value. However, when the present invention is applied as a disc medium, an orientation process is needed such that the orientation is randomized.

Plastic rolls having heat resistance are preferably used as calendering rolls. The plastic may be epoxy, polyimide, polyamide, or poly(imide-amide). Metal rolls alone can also be used for the calendering. The calendering temperature is preferably 80° C. or more, more preferably 90° C. or more. The linear pressure during calendering is preferably 200 kg/cm or more, more preferably 300 kg/cm or more. The effect of the present invention can be provided more and more by the calendering treatment at a temperature of 80° C. or more and at a linear pressure of 200 kg/cm or more.

In the present invention, the friction coefficients of the magnetic layer and the opposite side surface thereof with SUS420J are preferably 0.5 or less, more preferably 0.3 or less. The surface resistivity of the magnetic layer is from $10^4$ to $10^{11}$ Ω/sq. When the nonmagnetic layer is coated alone, the surface resistivity is from $10^4$ to $10^8$ Ω/sq. The surface resistivity of the backing layer is from $10^4$ to $10^8$ Ω/sq. The modulus at 0.5% elongation of the magnetic layer is from 300 to 2,000 kg/mm² in both the running and width directions. The break strength thereof is from 2 to 30 kg/cm². The modulus of the magnetic recording medium is from 100 to 1,500 kg/mm² in both the running and width directions. The residual elongation thereof is 0.5% or less. And the thermal shrinkage thereof at any temperature of 100° C. or less is preferably 1% or less, more preferably 0.5% or less, and most preferably 0.1% or less.

The glass transition temperature (the temperature at which the loss modulus in a dynamic visco-elasticity measurement at 110 Hz becomes maximum) of the magnetic layer is preferably from 50° to 120° C., while that of the nonmagnetic layer is preferably from 0° to 100° C. The loss modulus of the magnetic recording medium is preferably from $1\times10^8$ to $8\times10^9$ dyne/cm², and the loss tangent is preferably 0.2 or less. Too large loss tangents are disadvantageous because sticking problems result.

The residual solvent content in the magnetic layer is preferably 100 mg/m² or less, more preferably 10 mg/m² or less. Preferably, the residual solvent content in the upper layer is lower than that in the lower layer.

The void content of each of the magnetic layers and the nonmagnetic layers is preferably 30% by volume or less, more preferably 20% by volume or less. It is preferred that the void content is smaller to obtain high output. However, it is better in some cases that a given value is kept according to purpose. For example, when the void content is larger, running durability is often preferred in the magnetic recording media for data recording which are repeatedly used. In this case, the void content can be easily set to a value within an appropriate range according to the purpose.

When the magnetic characteristics of the magnetic recording medium of the present invention are measured at a magnetic field of 5 kOe, the squareness ratio in the tape running direction is 0.70 or more, preferably 0.80 or more, and more preferably 0.90 or more. It is preferred that the squareness ratio in two directions perpendicular to the tape running direction is 80% or less of that in the tape running direction. The SFD of the magnetic layer is preferably 0.6 or less.

The center line average surface roughness (Ra) of the magnetic layer is preferably from 1 to 20 nm. The Ra can be appropriately set according to purpose. A smaller Ra value is preferred from the view point of obtaining excellent electromagnetic characteristics, while a larger Ra value is preferred from the viewpoint of obtaining good running durability. The RMS surface roughness $R_{RMS}$ determined by evaluation with STM is preferably from 3 to 16 nm.

The magnetic recording medium of the present invention may be composed of a multi-layer structure, and the physical properties of each layer may be changed according to the purpose. For example, the modulus of the upper layer may be made high to improve running durability, and at the same time, the modulus of the lower layer may be made lower than that of the magnetic layer to hereby improve the contact of the head.

The present invention is now illustrated in greater detail by reference to the following examples which, however, are not to be construed as limiting the invention in any way. In the following examples, parts are by weight, unless otherwise indicated.

EXAMPLES

EXAMPLES 1-1 TO 1-3 AND COMPARATIVE EXAMPLES 1-1 AND 1-2

One hundred parts of ferromagnetic alloy particle (composition: Fe 94%, Zn 4%, Ni 2%; Hc: 1500 Oe; crystallite size: 200 Å) was crushed in an open kneader for 10 minutes and kneaded together with 15 parts of the binder shown in Tables 1 and 2 below, 20 parts of methyl ethyl ketone and 30 parts of cyclohexanone for 60 minutes. Subsequently, the following ingredients were added thereto.

| | |
|---|---|
| Polyurethane resin (Tables 1 to 3) | 5 parts |
| Abrasive ($Al_2O_3$ particle size: 0.3 μm) | 2 parts |

-continued

| | |
|---|---|
| Carbon black (average particle size: 40 nm) | 2 parts |
| Methyl ethyl ketone/toluene = 1/1 | 200 parts |

The mixture was dispersed in a sand mill for 120 minutes.

Subsequently, the following ingredients were added thereto.

| | |
|---|---|
| Polyisocyanate (Coronate 3041, a product of Nippon Polyurethane Co., Ltd.) (on a solid basis) | 3 parts |
| sec-Butyl stearate | 1 part |
| Butoxyethyl stearate | 1 part |
| Stearic acid | 1 part |
| Methyl ethyl ketone | 50 parts |

The mixture was mixed with stirring for 20 minutes and filtered through a filter having an average pore size of 1 μm to obtain a magnetic coating composition. The resulting magnetic coating composition was coated on an aramid support of 8 μm in thickness in such an amount as to provide a dry thickness of 2.5 μm. The coating was conducted by means of reverse roll coating.

The magnetic composition-coated nonmagnetic support as undried was subjected to magnetic orientation by using of a magnet of 3,000 gausses. After drying, the coated product was calendered by a combination of metallic roll-metallic roll-metallic roll-metallic roll-metallic roll-metallic roll-metallic roll (speed: 100 m/min; linear pressure: 300 kg/cm; temperature: 90° C.). The calendered tape was slit into tapes of 8 mm in width, thus obtaining 8 mm video tape samples.

TABLE 1

| | Polyvinyl Acetal Resin having Polar Group | Polyurethane Resin having Polar Group |
|---|---|---|
| Example 1-1 | $A_1$ | $a_1$ |
| Example 1-2 | $B_1$ | $b_1$ |
| Example 1-3 | $C_1$ | $c_1$ |
| Comp. Ex. 1-1 | $A_1$ | $d_1$ |
| Comp. Ex. 1-2 | $B_1$ | $e_1$ |

TABLE 2

| | Polyvinyl Acetal Resin having Polar Group | | |
|---|---|---|---|
| | $A_1$ | $B_1$ | $C_1$ |
| Vinyl Acetal (mol %) | 50 | 42 | 61 |
| Vinyl Butyral (mol %) | 11.8 | 21.6 | 6.6 |
| VAc (mol %) | 0.8 | 0.8 | 5 |
| VOH (mol %) | 37 | 35 | 27 |
| Sodium Vinylsulfonate (mol %) | 0.4 | 0.6 | 0 |
| Sodium Allylsulfonate (mol %) | 0 | 0 | 0.4 |
| Degree of Polymerization | 340 | 280 | 390 |
| Tg (°C.) | 87 | 79 | 96 |

TABLE 3

| | | Polyurethane Resin having Polar group | | |
|---|---|---|---|---|
| Monomer Composition | Mw | Polar Group | Content of Polar Group ($\times 10^{-5}$ eq/g) | Tg (°C.) |
| $a_1$ PCL/iPA/NPG/DEIS/MDI | 47000 | —SO$_3$Na | 5.7 | 58 |
| $b_1$ PPG/iPA/BD/DEIS/TDI | 69000 | —SO$_3$Na | 9.9 | 43 |
| $c_1$ ApA/BD/CHM/DMPA/IPDI | 95000 | —COOH | 15 | 5 |
| $d_1$ PCL/iPA/NPG/MDI | 56000 | none | 0 | 58 |
| $e_1$ PPG/iPA/BD/TDI | 61000 | none | 0 | 43 |

Note:
PCL Polycaprolactone
iPA Isophthalic acid
NPG Neopentyl glycol
DEIS Sodium diethylene glycol isophthalic acid diester
MDI Diphenylmethane-4,4'-diisocyanate
PPG Polypropylene glycol
BD Butanediol
TDI Tolylene diisocyanate
ApA Adipic acid
CHM Cyclohexane dimethanol
DMPA Dimethylol Propionic acid
IPDI Isophorone diisocyanate

EXAMPLES 1-4 TO 1-6 AND COMPARATIVE EXAMPLES 1-3 AND 1-4

Preparation of Coating Composition for Upper Magnetic Layer

Each of the coating composition of Examples 1-1 to 1-3 and Comparative Examples 1-1 and 1-2 was used.

| Preparation of Coating Composition for Nonmagnetic Layer Formulation of Coating Composition for Nonmagnetic Layer | |
|---|---|
| TiO$_2$ | 85 parts |
| average particle size | 0.035 μm |
| crystal form | rutile type |
| TiO$_2$ content | 90% or more |
| surface treatment layer | Al$_2$O$_3$ |
| S$_{BET}$ | 35 to 45 m$^2$/g |
| true specific gravity | 4.1 |
| pH | 6.5 to 8.0 |
| Carbon black | 5 parts |
| average particle size | 160 nm |
| DBP oil absorption | 80 ml/100 g |
| pH | 8.0 |
| S$_{BET}$ | 250 m$^2$/g |
| coloring power | 143% |
| Vinyl chloride copolymer (MR110, a product of The Japanese Geon Co., Ltd.) | 13 parts |
| —SO$_3$Na content: having —OH and epoxy groups | $8 \times 10^{-5}$ eq/g |
| Tg: | 71° C. |
| degree of polymerization: | 300 |
| number average molecular weight (Mn): | 12000 |
| weight average molecular weight (Mw): | 38000 |
| Polyurethane (UR 8300, a product of Toyobo Co., Ltd.) | 5 parts |
| Cyclohexane | 100 parts |
| Methyl ethyl ketone | 100 parts |

The above composition was mixed and dispersed in a sand mill for 4 hours. Subsequently, 5 parts of polyisocyanate (Coronate L), 5 parts of oleic acid, 5 parts of stearic acid and 15 parts of butyl stearate were added thereto to obtain the coating composition for the nonmagnetic layer.

The above coating compositions were coated by using two doctors having different gaps. While the coated compositions were still wet, an orientation treatment was carried out by using a permanent magnet of gausses and an electromagnet of 1600 gausses, and drying was then conducted. The resulting dried coated tape was supercalendered at 80° C. through metallic roll and metallic roll. The thickness of the coated magnetic layer was 0.3 μm, and that of the coated nonmagnetic layer was 3.0 μm.

A coating composition for the back coating layer was prepared by the following formulation.

| Formulation of Back Coating Layer | |
|---|---|
| Carbon black | 100 parts |
| S$_{BET}$ | 220 m$^2$/g |
| average particle size | 170 nm |
| DBP oil absorption | 75 ml/100 g |
| volatile matter | 1.5% |
| pH | 8.0 |
| bulk density | 240.2 kg/m$^2$ |
| Nitrocellulose (trade name: RS1/2 a product of DAICEL CHEMICAL INDUSTRIES, LTD.) | 100 parts |
| Polyurethane (UR 8300, a product of Toyobo Co., Ltd.) | 30 parts |
| Dispersant | |
| Copper oleate | 10 parts |
| Copper phthalocyanine | 10 parts |
| Barium sulfate (precipitated) | 5 parts |
| Methyl ethyl ketone | 500 parts |
| Toluene | 500 parts |

The above composition was pre-kneaded and then kneaded in a roll mill. To 100 parts of the resulting composition were added the following ingredients.

| | |
|---|---|
| Carbon black | 100 parts |
| S$_{BET}$ | 200 m$^2$/g |
| average particle size | 200 nm |
| DBP oil absorption | 36 ml/100 g |
| pH | 8.5 |
| α-Alumina | 0.1 part |

-continued

| | |
|---|---|
| (average particle size: 0.2 μm) | |

The mixture was dispersed in a sand grinder and filtered. To 100 parts of the resulting composition were added the following ingredients to obtain the coating composition.

| | |
|---|---|
| Methyl ethyl ketone | 120 parts |
| Polyisocyanate | 5 parts |

The resulting coating composition was coated on the opposite side of the nonmagnetic support to the side on which the magnetic layer was provided. The coating was carried out by using a bar coater in such an amount as to provide a dry thickness of 0.5 μm. The thus obtained raw tape was cut into tapes of 8 mm in width, thus preparing 8 mm video tape samples.

EXAMPLES 1-7 TO 1-9 AND COMPARATIVE EXAMPLES 1-5 AND 1-6

Samples were prepared in the same manner as in Examples 1-4 to 1-6 and Comparative Examples 1-3 and 1-5 except that the following magnetic composition was used as the coating composition for the lower layer.

| | |
|---|---|
| Co-γ-FeO$_x$ | 100 parts |
| x = 1.45 | |
| the length of the major axis: | 0.25 μm |
| Hc: | 8500 Oe |
| Br: | 1400 gausses |
| Vinyl chloride copolymer sulfonic acid group content: 0.25% by weight | 11 parts |
| Polyurethane resin —COOH group-containing polyester polyurethane; composition: caprolactone/ neopentyl glycol/ isophthalic acid/MDI | 4 parts |
| Tg: | 20° C. |
| —COOH group content: | $5 \times 10^{-5}$ eq/g |
| Mw: | 58000 |

-continued

| | |
|---|---|
| (average particle size: 20 nm) | |
| Methyl ethyl ketone/cyclohexanone = 7/3 (solvent) | 200 parts |

Each of the resulting samples was evaluated in the following manner.

Measuring Method

1) Electromagnetic characteristics

Signals were recorded on the sample tapes by using Hi8-VTR (TR-705, a product of Sony Corporation) and reproduced. S/N was measured by a noise meter. The S/N in terms of the relative value is shown in Tables when the value of Comparative Example 1-1 is referred to as 0 dB.

2) Surface roughness Ra

The surface roughness was determined as the center line average roughness Ra by a light interference method using a digital optical profimeter (a product of WYKO CO., LTD.) under a condition of cut off value of 0.25 mm.

3) Squareness ratio (SQ)

The tape samples were tested by using a vibration sample type fluxmeter (a product of Toei Kogyo Co., Ltd.), and SQ=Br/Bm was determined at an Hm of 10 kOe.

4) Amount of surface urethane resin (N/Fe)

The ratio of N of surface urethane resin to Fe of ferromagnetic particle on the surface of the magnetic layer is represented by the intensity ratio of ($N_{1S}$ peak/($Fe_{2p}$3/2) peak) by using ESCA (PHI-500, a product of Phi Co., Ltd.) (X-ray source: Mg anode and output of 300 W).

5) Clogging

Tapes of 90 min long were repeatedly run 100 times in an atmosphere of 23° C. an 20% RH by using the deck of Hi8-VTR (TR-705) above. The mark x in Tables shows that clogging is caused and signals cannot be reproduced. The mark ○ shows that clogging is not caused.

6) Sticking during storage

The tape wound around a reel was allowed to stand at 60° C. an 90% RH for 2 days. The mark x in Tables shows that tape is sticked together and cannot be loosened. The mark ○ shows that the tape is not sticked together.

TABLE 4

| | Polyvinyl Acetal Resin having Polar Group | Polyurethane Resin having Polar Group | S/N (dB) | Ra (nm) | SQ | N/Fe | Clogging | Sticking after Storage |
|---|---|---|---|---|---|---|---|---|
| Example 1-1 | $A_1$ | $a_1$ | 0.9 | 3.9 | 0.92 | 0.027 | ○ | ○ |
| Example 1-2 | $B_1$ | $b_1$ | 0.7 | 3.9 | 0.91 | 0.024 | ○ | ○ |
| Example 1-3 | $C_1$ | $c_1$ | 0.8 | 4.1 | 0.91 | 0.029 | ○ | ○ |
| Comp. Ex. 1-1 | $A_1$ | $d_1$ | 0 | 4.7 | 0.87 | 0.035 | X | X |
| Comp. Ex. 1-2 | $B_1$ | $e_1$ | −0.2 | 4.9 | 0.88 | 0.038 | X | X |

-continued

| | |
|---|---|
| Polyisocyanate (Coronate L, a product of Nippon Polyurethane Co., Ltd.) | 5 parts |
| Stearic acid (commercial) | 1 part |
| Butyl stearate (commercial) | 1 part |
| Electrically conductive carbon | 1 part |

TABLE 5

|  | Polyvinyl Acetal Resin having Polar Group | Polyurethane Resin having Polar Group | S/N (dB) | Ra (nm) | SQ | N/Fe | Clogging | Sticking after Storage |
| --- | --- | --- | --- | --- | --- | --- | --- | --- |
| Example 1-4 | $A_1$ | $a_1$ | 1.8 | 2.9 | 0.92 | 0.029 | o | o |
| Example 1-5 | $B_1$ | $b_1$ | 1.7 | 2.8 | 0.92 | 0.026 | o | o |
| Example 1-6 | $C_1$ | $c_1$ | 1.8 | 2.9 | 0.92 | 0.028 | o | o |
| Comp. Ex. 1-3 | $A_1$ | $d_1$ | 0.5 | 3.8 | 0.87 | 0.037 | X | X |
| Comp. Ex. 1-4 | $B_1$ | $e_1$ | 0.4 | 4.2 | 0.87 | 0.036 | X | X |

TABLE 6

|  | Polyvinyl Acetal Resin having Polar Group | Polyurethane Resin having Polar Group | S/N (dB) | Ra (nm) | SQ | N/Fe | Clogging | Sticking after Storage |
| --- | --- | --- | --- | --- | --- | --- | --- | --- |
| Example 1-7 | $A_1$ | $a_1$ | 1.4 | 3.4 | 0.92 | 0.026 | o | o |
| Example 1-8 | $B_1$ | $b_1$ | 1.3 | 3.5 | 0.92 | 0.026 | o | o |
| Example 1-9 | $C_1$ | $c_1$ | 1.3 | 3.5 | 0.92 | 0.025 | o | o |
| Comp. Ex. 1-5 | $A_1$ | $d_1$ | 0.1 | 4.8 | 0.87 | 0.035 | X | X |
| Comp. Ex. 1-6 | $B_1$ | $e_1$ | 0.2 | 4.6 | 0.87 | 0.034 | X | X |

It is apparent from the results shown in the above Tables that the samples of the present invention are excellent in smoothness and SQ, and the amounts of surface urethane resin in Examples are small in comparison with the amounts of surface urethane resin in Comparative Examples. Further, it is clear that the samples of the present invention have excellent electromagnetic characteristics and can effectively prevent clogging and sticking during storage.

Further, another embodiment will be illustrated below. In the following examples, parts and % are by weight, unless otherwise indicated.

EXAMPLES 2-1 TO 2-6 AND COMPARATIVE EXAMPLE 2-1 Synthesis Example of Polyvinyl Acetal Resin Polyvinyl alcohol (a degree of polymerization: 300; a degree of saponification: 95 mol %), 5 g of the following compound A having a polar group, 500 g of dimethylformamide and 5 g of pyridine were added to a 2000 ml separable flask. After a dehydrochlorination reaction was carried out for two hours, 100 g of distilled water was added. Further, 100 g of an aqueous solution (30 wt %) of hydrochloric acid and 40 g of acetaldehyde were added thereto to precipitate out a colorless powder. The reaction system was kept at 30° C. for 4 hours, washed with water, neutralized an dried to obtain Polyvinyl acetal resin $A_2$.

Polyvinyl acetal resin $B_2$ was prepared in the same manner as described above, except that the following Compound $B_2$ having a polar group was used in place of Compound $A_2$ having a polar group.

Polyvinyl acetal resin $C_2$ was prepared in the same manner as described above, except that the following Compound $C_2$ having a polar group was used in place of Compound $A_2$ having a polar group.

Compound $A_2$ having a polar group: $ClCH_2CH_2SO_3Na$
Compound $B_2$ having a polar group: $ClCH_2CH_2COOH$
Compound $C_2$ having a polar group: $ClCH_2CH_2OPO(OH)_2$ The characteristics of the resulting polyvinyl acetal resins are shown in Table 7 below.

TABLE 7

|  | Polyvinyl Acetal Resin | | |
| --- | --- | --- | --- |
|  | $A_2$ | $B_2$ | $C_2$ |
| Vinyl Acetal (mol %) | 70 | 68 | 75 |
| Vinyl Acetate (mol %) | 5 | 5 | 5 |
| Vinyl Alcohol (mol %) | 23 | 25 | 18 |
| Compound $A_2$ (mol %) | 2 | 0 | 0 |
| Compound $B_2$ (mol %) | 0 | 2 | 0 |
| Compound $C_2$ (mol %) | 0 | 0 | 2 |
| Degree of Polymerization | 340 | 280 | 390 |
| Tg (°C.) | 105 | 101 | 110 |

Synthesis Example of Polyurethane Resin $A_2$
(—OH group content: three —OH groups per molecule)

To a 2000 ml three-necked flask equipped with a condenser and a stirrer and previously purged with nitrogen gas, there were added 225 g of butanediol adipate polyester polyol (molecular weight: 2000), 7 g of neopentyl glycol and 3.2 g of dihydroxyethyl 5-sodiumsulfoisophthalate, and the mixture was dissolved in 690 g of a mixed solvent of toluene and cyclohexanone (¹/₁). Subsequently, 70 g of MDI was added thereto. Further, 0.031 g (0.049 mol) of di-n-butyltin dilaurate as a catalyst was added thereto. The mixture was heated at 90° C. with stirring in a nitrogen gas stream for one hour, and 0.6 g of trimethylolpropane was then added thereto. The mixture was heated with stirring for one hour to obtain Polyurethane resin $A_2$. The resulting polyurethane resin had a weight average molecular weight of 51,000 (in terms of polystyrene in THF solvent).

Synthesis Example of Polyurethane Resin $B_2$
(—OH group content: four —OH groups per molecule)

Polyurethane resin $B_2$ was prepared in the same manner as in the preparation of Polyurethane resin $A_2$, except that pentaerythritol was used in place of trimethylolpropane.

EXAMPLE 2-1

One hundred parts of ferromagnetic alloy particle (composition: Fe 94%, Zn 4%, Ni 2%; coercive force (Hc): 1500 Oe; crystallite size: 200 Å) was crushed in an open kneader for 10 minutes and was kneaded together with 10 parts of Polyvinyl acetal resin $A_2$ and 60 parts of methyl ethyl ketone for 60 minutes. Subsequently, the following ingredients were added thereto.

| | |
|---|---|
| Polyurethane resin $A_2$ (on a solid basis) | 10 parts |
| Abrasive ($Al_2O_3$; particle size: 0.3 μm) | 2 parts |
| Carbon black | 2 parts |
| (average particle size: 400 nm) | |
| Methyl ethyl ketone/toluene = 1/1 | 200 parts |

The mixture was dispersed in a sand mill for 120 minutes. Further, the following ingredients were added thereto.

| | |
|---|---|
| Polyisocyanate (Coronate 3041, a product of Nippon Polyurethane Co., Ltd.) (on a solid basis) | 5 parts |
| sec-Butyl stearate | 1 part |
| Butoxyethyl stearate | 1 part |
| Stearic acid | 1 part |
| Methyl ethyl ketone | 50 parts |

The mixture was mixed with stirring for 20 minutes and filtered through a filter having an average pore size of 1 μm to prepare a magnetic coating composition. The resulting magnetic coating composition was coated on the surface of a polyethylene terephthalate support of 10 μm in thickness in such an amount as to provide a dry thickness of 2.5 μm. The coating was carried out by means of reverse roll coating.

While the coated magnetic coating composition was undried, the thus coated nonmagnetic support was oriented in a magnetic field by using a magnet of 3,000 gausses. After drying, the coated tape was calendered by a combination of metallic roll-metallic roll-metallic roll-metallic roll-metallic roll-metallic roll-metallic roll (speed: 100 m/min; linear pressure: 300 kg/cm; temperature: 90° C.). The calendered tape was then slit into tapes of 8 mm in width, thus preparing 8 mm video tape sample.

EXAMPLE 2-2

The procedure of Example 2-1 was repeated, except that Polyurethane resin $B_2$ was used in place of Polyurethane resin $A_2$.

EXAMPLE 2-3

The procedure of Example 2-1 was repeated, except that Polyvinyl acetal resin $B_2$ was used in place of Polyvinyl acetal resin $A_2$.

EXAMPLE 2-4

The procedure of Example 2-1 was repeated, except that Polyvinyl acetal resin $C_2$ was used in place of Polyvinyl acetal resin $A_2$.

EXAMPLE 2-5

Preparation of Coating Composition for Upper Magnetic layer

The coating composition obtained in Example 2-1 was used.

| Preparation of Coating Composition for Nonmagnetic Layer Formulation of Coating Composition for Nonmagnetic Layer | |
|---|---|
| $TiO_2$ | 85 parts |
| average particle size | 0.035 μm |
| crystal form | rutile type |
| $TiO_2$ content | 90% or more |
| surface treatment layer | $Al_2O_3$ |
| $S_{BET}$ | 35 to 45 m$^2$/g |
| true specific gravity | 4.1 |
| pH | 6.5 to 8.0 |
| Carbon black | 5 parts |
| average particle size | 160 nm |
| DBP oil absorption | 80 ml/100 g |
| pH | 8.0 |
| $S_{BET}$ | 250 m$^2$/g |
| coloring power | 143% |
| Vinyl chloride copolymer | 13 parts |
| —$SO_3Na$ content: | $8 \times 10^{-5}$ eq/g |
| having an —OH group and an epoxy groups | |
| Tg: | 71° C. |
| a degree of polymerization: | 300 |
| number average molecular weight (Mn): | 12000 |
| weight average molecular weight (Mw): | 38000 |
| Polyurethane resin B | 5 parts |
| Cyclohexane | 100 parts |
| Methyl ethyl ketone | 100 parts |

The above composition was mixed and dispersed in a sand mill for 4 hours. Subsequently, 5 parts of polyisocyanate (Coronate L), 5 parts of oleic acid, 5 parts of stearic acid and 15 parts of butyl stearate were added thereto to obtain the coating composition for nonmagnetic layer.

The above coating compositions were coated on a support by using two doctors having different gaps. While the coated compositions were still in a wet state, an orientation treatment was carried out by using a permanent magnet of 3500 gausses and then an electromagnet of 1600 gausses. After drying, the coated tape was supercalendered at 80° C. through metallic roll and metallic roll. The thickness of the coated magnetic layer was 0.3 μm, and that of the coated nonmagnetic layer was 3.0 μm.

A coating composition for back coating layer was prepared in the following manner.

| Formulation of Back Coating Layer | |
|---|---|
| Carbon black | 100 parts |
| $S_{BET}$ | 220 m$^2$/g |
| average particle size | 170 nm |
| DBP oil absorption | 75 ml/100 g |
| volatile matter | 1.5% |
| pH | 8.0 |
| bulk density | 240.2 kg/m$^2$ |

-continued

| | |
|---|---|
| Nitrocellulose (trade name: RS1/2) | 100 parts |
| Polyurethane (UR 8300, a product of Toyobo Co., Ltd.) | 30 parts |
| Dispersant | |
| Copper oleate | 10 parts |
| Copper phthalocyanine | 10 parts |
| Barium sulfate (precipitated) | 5 parts |
| Methyl ethyl ketone | 500 parts |
| Toluene | 500 parts |

The above composition was pre-kneaded and then kneaded in a roll mill. To 100 parts of the resulting composition were the following ingredients.

| | |
|---|---|
| Carbon black | 100 parts |
| $S_{BET}$ | 200 m²/g |
| average particle size | 200 nm |
| DBP oil absorption | 36 ml/100 g |
| pH | 8.5 |
| $\alpha$-$Al_2O_3$ (average particle size: 0.2 μm) | 0.1 part |

The resulting composition was dispersed in a sand grinder and filtered. To 100 parts of the resulting composition were added the following ingredients to prepare the coating composition.

| | |
|---|---|
| Methyl ethyl ketone | 120 parts |
| Polyisocyanate | 5 parts |

The resulting coating composition was coated on the opposite side of the nonmagnetic support to the side on which the magnetic layer was provided. The coating was conducted by using a bar coater in such amount as to provide a dry thickness of 0.5 μm. The thus obtained raw tape was cut into tapes of 8 mm in width, thus preparing 8 mm video tape sample.

EXAMPLE 2-6

The procedure of Example 2-5 was repeated, except that the following magnetic coating composition was used as the coating composition for the lower layer.

| | |
|---|---|
| Co-γ-$FeO_x$ | 100 parts |
| x = 1.45 | |
| the length of the major axis: | 0.25 μm |
| Hc: | 8500 Oe |
| Br: | 1400 gausses |
| Vinyl chloride copolymer | 11 parts |
| sulfo group content: 0.25% by weight | |
| Polyurethane Resin B | 4 parts |
| Polyisocyanate (Coronate L, a product of Nippon Polyurethane Co., Ltd.) | 6 parts |
| Stearic acid (commercial) | 1 part |
| Butyl stearate (commercial) | 1 part |
| Electrically conductive carbon (average particle size: 20 nm) | 1 part |
| Methyl ethyl ketone/cyclohexanone = 7/3 (solvent) | 200 parts |

COMPARATIVE EXAMPLE 2-1

The procedure of Example 2-1 was repeated, except that the vinyl chloride copolymer of Example 2-5 was used in place of Polyvinyl acetal resin $A_2$, and Polyurethane resin $B_2$ was used in place of Polyurethane resin $A_2$.

The resulting samples were evaluated in the following manner.

1) Electromagnetic Characteristics (S/N)

7 MHz signals were recorded on the sample tapes by using Hi8-VTR (TR-705, a product of Sony Corporation) and reproduced. S/N was measured by a noise meter. The S/N in terms of the relative value is shown in Table 8 below when the value of Comparative Example 2-1 was referred to as 0 dB.

2) Repeated Running properties 90 min long tapes were repeatedly run 100 times at 23° C. and 70% RH by using the same VTR as that used in the measurement of electromagnetic characteristics. The stain of video head was observed. Further, video output was recorded, and 100th running output was measured when the first running output was referred to as 0 dB. The results obtained are shown in Table 8 below. The criterion of the stain of video head is as follows:

The mark ○ shows that stain is not observed.

The mark Δ shows that when the stained area is wiped off, stain is observed.

The mark x shows that stain is visually observed.

3) Stain of calender

The stain of rolls in the calendering stage is evaluated in the following criterion.

The mark ○ shows that stain is not observed.

The mark Δ shows that when the contaminated area is wiped off, stain is observed.

The mark x shows that stain is visually observed.

4) Sticking

The mark x shows that sticking is caused within one week when the tape wound around a reel is stored at 60° C. and 90% RH.

The mark Δ shows that sticking is caused in one to four weeks.

The mark ○ shows that sticking is nor caused.

5) Compatibility

The polyvinyl acetal resin or the polyvinyl chloride resin and the polyurethane resin in a ratio of 1:1 by weight are dissolved in a solution (30 wt %) of cyclohexanone, and the evaluation is visually made.

The mark ○ shows that the solution is clear.

The mark x shows that the solution is cloudy.

6) Squareness ratio (SQ)

The tape samples are tested by using a vibration sample type fluxmeter (a product of Toei Kogyo Co., Ltd.), and SQ=Br/Bm is determined at an Hm of 10 kOe.

7) Ra (nm), N/Fe and clogging

Ra (nm), N/Fe and clogging were evaluated in the same manner as in Example 1-1.

TABLE 8

| | Polyurethane Resin | | SQ | Contamination of Calender Roll | Repeated Running Properties (dB) | (Evaluation) | Sticking | S/N | Compatibility | Ra | N/Fe | Clogging |
|---|---|---|---|---|---|---|---|---|---|---|---|---|
| Example 2-1 | Polyvinyl Acetal Resin A$_2$ | A$_2$ | 0.94 | o | −0.1 | o | o | +0.4 | o | 3.8 | 0.022 | o |
| Example 2-2 | Polyvinyl Acetal Resin A$_2$ | B$_2$ | 0.94 | o | +0.0 | o | o | +0.4 | o | 3.8 | 0.021 | o |
| Example 2-3 | Polyvinyl Acetal Resin B$_2$ | A$_2$ | 0.85 | o | −0.0 | o | o | −0.1 | o | 4.3 | 0.022 | o |
| Example 2-4 | Polyvinyl Acetal Resin C$_2$ | A$_2$ | 0.94 | o | −0.2 | o | o | +0.3 | o | 4.0 | 0.024 | o |
| Example 2-5 | Polyvinyl Acetal Resin A$_2$ | A$_2$ | 0.94 | o | −0.1 | o | o | +0.6 | o | 3.9 | 0.026 | o |
| Example 2-6 | Polyvinyl Acetal Resin A$_2$ | A$_2$ | 0.94 | o | −0.0 | o | o | +0.7 | o | 4.1 | 0.028 | o |
| Comp. Ex. 2-1 | Vinyl Chloride Copolymer | B$_2$ | 0.90 | o | −0.6 | Δ | Δ | +0.0 | o | 4.9 | 0.031 | X |

It can be seen from the results shown in Table 8 that the polyvinyl acetal resin and the polyurethane resin are well compatible with each other in the samples of the present invention and as a result, the samples of the present invention are free from the problem with regard to the stain of calender rolls and have improved properties with regard to sticking in comparison with comparative sample. Further, the samples of the present invention have good repeated running properties and electromagnetic characteristics. Particularly, when the magnetic recording medium is composed of a multi-layer structure, electromagnetic characteristics is remarkably superior.

It will be understood from the above disclosure that when the polyvinyl acetal resin having a polar group and the polyurethane resin having a polar group are used as the binder resin components according to the present invention, dispersibility can be improved, the problems with regard to clogging and sticking can be solved, excellent electromagnetic characteristics can be obtained. In addition, there are advantages that the problem with regard to the stain of head can be solved, the problem of sticking during long-term storage under high temperature conditions can be improved and the stain of calender rolls is not caused. Further, since the compatibility is improved, the dispersibility of ferromagnetic powder can be improved and electromagnetic characteristics can be improved.

While the present invention has been described in detail and with reference to specific embodiments thereof, it is apparent to one skilled in the art that various changes and modifications can be made therein without departing from the spirit and the scope of the present invention.

What is claimed is:

1. A magnetic recording medium comprising a nonmagnetic support having on at least one side thereof a magnetic layer comprising ferromagnetic particles and a binder, wherein the binder comprises a polyvinyl acetal resin having a polar group and a polyurethane resin having a polar group, the polar groups of both the polyvinyl acetal resin and the polyurethane resin each being at least one polar group selected from the group consisting of —COOM, —SO$_3$M, —SO$_3$M, —PO(OM')$_2$, —OPO(OM')$_2$, —NR$^1$R$^2$ and —N$^+$R$^1$R$^2$R$^3$X$^-$, wherein M represents H, Li, Na or K; M' represents H, Li, Na, K or an alkyl group; R$^1$, R$^2$ and R$^3$ are the same or different and each represents a hydrogen atom or an alkyl group; and X represents a halogen atom; and the polyurethane resin has three or more —OH groups per molecule; the polyvinyl acetal resin having a structure represented by the following formula (I):

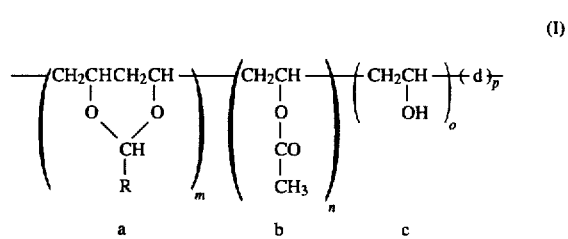

wherein R represents an alkyl group; d represents a unit derived from a comonomer having a polar group; and m≧40 mol %, o≦40 mol %, n≦10 mol %, p≦5 mol %, and m+n+o+p=100 mol %.

2. The magnetic recording medium as claimed in claim 1, wherein the amount of polar group is from $1 \times 10^{-1}$ to $1 \times 10^{-3}$ eq/g.

3. A magnetic recording medium comprising (a) a nonmagnetic support having on at least one side thereof at least one of a lower magnetic layer comprising ferromagnetic particles and a binder and a nonmagnetic layer comprising nonmagnetic particles and a binder and (b) an upper magnetic layer comprising ferromagnetic particles and a binder provided thereon, wherein at least the binder contained in the upper magnetic layer comprises a polyvinyl acetal resin having a polar group and a polyurethane resin having a polar group, the polar groups of both the polyvinyl acetal resin and the polyurethane resin each being at least one polar group selected from the group consisting of —COOM, —SO$_3$M, —OSO$_3$M, —PO(OM')$_2$, —OPO(OM')$_2$, —NR$^1$R$^2$ and —N$^+$R$^1$R$^2$R$^3$X$^-$, wherein M represents H, Li, Na or K; M' represents H, Li, Na, K or an alkyl group; R$^1$, R$^2$ and R$^3$ are the same or different and each represents a hydrogen atom or an alkyl group; and X represents a halogen atom, and the polyurethane resin has three or more —OH groups per molecule; the polyvinyl acetal resin having a structure represented by the following formula (I):

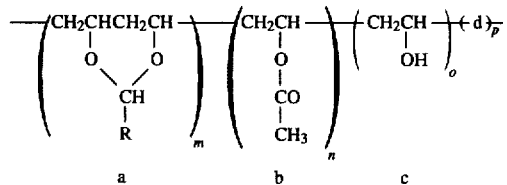# (I)

wherein R represents an alkyl group; d represents a unit derived from a comonomer having a polar group; and $m \geq 40$ mol %, $o \leq 40$ mol %, $n \leq 10$ mol %, $p \leq 5$ mol %, and $m+n+o+p=100$ mol %.

4. The magnetic recording medium as claimed in claim 3, wherein at least one layer of the lower magnetic layer, the upper magnetic layer and the nonmagnetic layer comprises at least one selected from the group consisting of alumina, chromium oxide, red oxide, silicon carbide and titanium oxide.

* * * * *